Nov. 1, 1955     J. DE GIER ET AL     2,722,085
METHOD OF SEALING AN IRON CONE TO A GLASS WINDOW
Filed Nov. 6, 1951
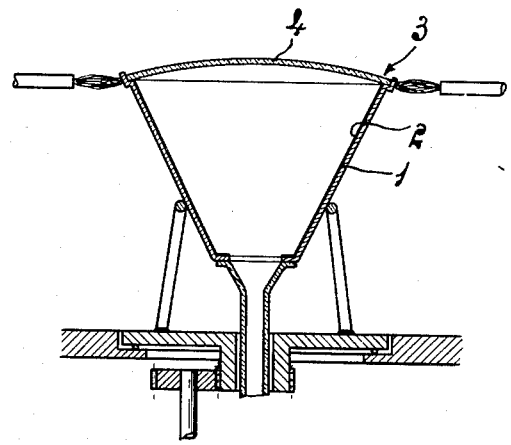
INVENTORS
Johannes de Gier
Theodorus Hagenberg
By
Agent

United States Patent Office 2,722,085
Patented Nov. 1, 1955

2,722,085

METHOD OF SEALING AN IRON CONE TO A GLASS WINDOW

Johannes de Gier and Theodorus Hagenberg, Eindhoven, Netherlands, assignors to Hartford National Bank and Trust Company, Hartford, Conn., as trustee Application November 6, 1951, Serial No. 255,042

Claims priority, application Netherlands November 18, 1950

4 Claims. (Cl. 49—81)

This invention relates to a method of sealing an iron cone to a glass window of a cathode-ray tube and to cathode-ray tubes manufactured by this method, the fluorescent screen of these tubes being formed by settling a liquid carrying the screen material in suspension.

Using an iron cone results in the iron being attacked by the settling liquid during the application of the fluorescent screen, so that strains are produced on the screen. Because of the strong oxidation of the iron, it is difficult to seal such a cone directly to glass. A low-melting enamel has been also used, which, however, does not resist the mechanical and chemical cleaning means and the settling liquid.

It has also been suggested that a high melting enamel be used to secure the window to the cone which resists these effects and which covers a certain portion of the inner side of the iron cone, so that during the settling of the screen, the settling liquid is not in contact with the iron of the cone. The iron is thus protected by the enamel layer. Since, however, the adhesion of glass to iron using enamel as a sealing means is considerably inferior to a direct glass-to-metal seal, it is desirable to seal such windows, if possible in a direct manner, to an iron cone. In this case, however, it would be superfluous to apply an enamelled zone to the cone. Consequently, in this case the iron cone must be protected in a different manner from chemical corrosion by the settling liquid which could be achieved by applying a layer of a more precious metal. The use of nickel in protecting a copper vessel constituting the anode of a mercury-vapour discharge tube in order to prevent the copper from being corroded by the mercury vapour has been known. Difficulties in the direct sealing of the nickel-plated copper vessel are avoided by heating the sealing edge during the sealing operation to such an extent that a thin nickel oxide film is produced.

However, if instead of a copper substratum an iron substratum is used, such a seal is found to be substantially impossible to realize due to the large quantity of gas released from the iron. This release of gas could be reduced by first providing the iron, in the usual manner, with a copper coating and then a nickel coating. However, it is impossible to use even the slightest amount of copper in cathode-ray tubes, in which the fluorescent screen is produced by settling, since a quantity of even 0.001% of copper in the settling liquid produces so-called "purple stains" on the screen.

It has furthermore been suggested to seal in conductors made of a chromium-nickel-iron alloy and provided with a nickel coating in order to increase the conductivity, the nickel coating being again chromium-plated in order to improve the adhesion to glass. In this case the conductor is previously heated for a long time to a high temperature in dry hydrogen in order to cause the various metal layers to form a partial alloy. The conductor is then heated to a low temperature in a wet hydrogen atmosphere in order to oxidize the chromium superficially. Such a method is very costly particularly for a large cone. Consequently, its advantage over the use of a cone completely made of ferrochromium is not worth mentioning.

It is also known to avoid excessive oxidation of iron conductors and hoods, which are sealed by means of a knife edge, during the sealing operation and by coating this edge with a very thin layer of chromium, nickel, gold or aluminum. However, such seals are found to include a considerable quantity of gas bubbles, which in the case of such knife-edge seals, need not be disadvantageous, but in the case of seals without knife-edge, particularly, in cathode-ray tubes, this is not permissible. Moreover, without the use of further means it is difficult to chromium-plate iron and a chromium layer in itself is not impervious and could consequently not prevent the iron from being corroded by the settling liquid.

It is an object of the invention to eliminate the aforesaid difficulties and to provide a method of sealing a glass window to an iron cone of a cathode-ray tube.

According to the invention, a thin nickel layer is applied to the sealing edge of the iron cone, after which at least the nickel-plated sealing zone of the cone, which if necessary is provided with a thin chromium layer, is degasified by heating. The glass window is then sealed to the cone and then cooled to relieve strain on the glass. The term "thin-layer" as used in the specification and claims is defined as a nickel or chromium layer less than 20 $\mu$ in thickness.

It has been found that, in spite of the generally large diameter, the sealing area exhibits substantially no gas bubbles. The local thin chromium layer on the nickel-plated sealing area may be found desirable in order to improve the adhesion of the glass. However, during the degasifying operation, the various metal layers should not form an alloy with one another or with the iron substratum. Consequently, the degasifying temperature should be chosen so as not to exceed the required value. In general heating to 50 or 100° C. in excess of the sealing temperature for a few minutes will suffice. Heating is performed by means of oxidizing flames, so that the nickel or chromium layer oxidizes in part.

The invention will be explained more fully with reference to the following example and the accompanying drawing which is illustrative only.

An ingot iron cone 1, the wide end of which is 40 cms. of diameter, is coated with a nickel layer 2 of less than 20 $\mu$ for example, 10 $\mu$. Then the sealing zone 3 at the wide end is heated for three minutes in an oxidizing flame at 950 to 1000° C. Thus the sealing zone 3 is degasified, while approximately 8 microns of the nickel-layer 2 is converted into oxide and degasified together with the iron substratum. Immediately thereupon the glass window 4, which may be preheated, if necessary, is brought into contact with the heated end 3 of the cone 1, after the latter has been cooled down, if required, to a temperature which is not harmful to the window. The temperature of the glass is then raised, the edges 3 of the cone and the window are sealed, for example at 900 to 950° C. and then cooled in the conventional manner to relieve strain in the glass. It has been found that in this manner a very satisfactory adhesion between the glass and the nickel layer is obtained, gas bubbles being substantially absent from the sealing edge. The nickel layer inside the cone is found to resist the chemical and mechanical cleaning means, which are used for cleaning the cone and for the application of the fluorescent screen. It also protects the iron wall from the settling liquid. If necessary, the nickel-plated sealing zone may be previously locally coated with a chromium layer of less than 20 $\mu$, preferably 3 $\mu$, which is converted wholly or in part into chromium oxide during the degasifying operation. Even in this case no alloys of the metals are formed during the degasifying operation. The sealing of the glass neck to the narrow end of the cone may also be carried out in a similar manner and preferably prior to the sealing of the window to the wide end of the cone.

The method according to the invention may yield all the advantages of a ferro-chromium cone using a cheap cone made of ordinary iron. Since the nickel layer is conductive, the entire inner side and, if necessary, also the outer side of the cone may be nickel-plated without any objection. Thus the iron is completely protected from corrosion on the inner and the outer sides, without the need of applying varnish or lacquer layers to the outer side. It is furthermore not necessary for the nickel layer to have the same thickness throughout its surface. Thus, for example, the inner side of the cone may be provided in the area of the window with a thicker nickel layer for a given width, for example, in a thickness of 20 μ, which improves the protection of the iron from the influence of the settling liquid. The further part of the cone may, in this case, have a nickel layer of, for example, only 10 μ.

While the invention has been described with reference to a specific example and application thereof, other modifications will be apparent to those skilled in the art without departing from the spirit and scope of the invention as defined in the appended claims.

What we claim is:

1. A method of sealing a glass part to a chromium-nickel-coated sealing edge of an iron cone of a cathode ray tube comprising the steps of heating the sealing edge in an oxidizing atmosphere at an elevated temperature and for a time interval at which substantially no diffusion will occur between the coating and the iron and at a temperature substantially above that at which sealing between a glass part and the cone will subsequently occur in order to degasify the sealing edge of the cone, thereafter cooling the cone to an elevated temperature at which a seal can be effected between the cone and a glass part without injuring the glass, thereafter placing the glass part in contact with the sealing edge and forming a seal therebetween while the sealing edge is still at an elevated temperature, and cooling the cone with the glass part sealed thereto to relieve strain in the glass part.

2. A method of sealing a glass part to a chromium-nickel-coated sealing edge of an iron cone of a cathode ray tube comprising the steps of heating the sealing edge in an oxidizing atmosphere at an elevated temperature, between 50 and 100° C. above the temperature at which sealing between a glass part and the cone will subsequently occur, for a few minutes to degasify the sealing edge of the cone, thereafter cooling the cone, thereafter placing the glass part in contact with the sealing edge and forming a seal therebetween while the sealing edge is still at an elevated temperature, and cooling the cone with the glass part sealed thereto to relieve strain in the glass part.

3. A method of sealing a glass part to a chromium-nickel-coated sealing edge of an iron cone of a cathode ray tube comprising the steps of heating the sealing edge in an oxidizing atmosphere at an elevated temperature, between 50 and 100° C. above the temperature at which sealing between a glass part and the cone will subsequently occur, for about 3 minutes to degasify the sealing edge of the cone, thereafter cooling the cone, thereafter placing the glass part in contact with the sealing edge while the latter is still at an elevated temperature, thereafter heating the glass part to a higher temperature to form a seal between the glass and the sealing edge, and cooling the cone with the glass part sealed thereto to relieve strain in the glass part.

4. A method of sealing a glass part to a chromium-nickel-coated sealing edge of an iron cone of a cathode ray tube comprising the steps of heating the sealing edge to an elevated temperature between 950 and 1000° C. for a few minutes in an oxidizing atmosphere to degasify the sealing edge of the cone, thereafter cooling the cone, thereafter placing the glass part in contact with the sealing edge while the sealing edge is still at an elevated temperature, sealing the glass part to the sealing edge at a temperature between 900 and 950° C., and cooling the cone with the glass part sealed thereto to relieve strain in the glass part.

References Cited in the file of this patent

UNITED STATES PATENTS

| 789,515 | Whitney | May 9, 1905 |
| 1,844,936 | Hotchkiss | Feb. 16, 1932 |
| 2,240,063 | Allen | Apr. 29, 1941 |
| 2,480,453 | Dorgelo et al. | Aug. 30, 1949 |
| 2,482,494 | Knochel et al. | Sept. 20, 1949 |
| 2,555,877 | Doran | June 5, 1951 |

FOREIGN PATENTS

| 259,927 | Great Britain | 1926 |
| 585,921 | Great Britain | Feb. 28, 1947 |